United States Patent [19]
Stenlund

[11] Patent Number: 5,149,019
[45] Date of Patent: Sep. 22, 1992

[54] BALLOON PARACHUTE

[75] Inventor: Sigvard J. Stenlund, Boulder, Colo.

[73] Assignee: University Corporation for Atmospheric Research, Boulder, Colo.

[21] Appl. No.: 768,031

[22] Filed: Sep. 30, 1991

[51] Int. Cl.[5] .............................................. B64D 17/02
[52] U.S. Cl. ................................... 244/145; 244/146; 244/152
[58] Field of Search ........... 244/142, 145, 146, 138 R, 244/113, 152, 3.27, 3.3; 102/337, 348, 354, 387, 405

[56] References Cited

U.S. PATENT DOCUMENTS

| | | | |
|---|---|---|---|
| 1,834,370 | 12/1931 | Askam | 244/145 |
| 2,993,667 | 7/1961 | Cushman | 244/142 |
| 3,152,782 | 10/1964 | Karpf | 244/145 |
| 3,234,503 | 2/1966 | Wojciechowski et al. | 244/145 |
| 3,403,876 | 10/1968 | Mitchell | 244/145 |
| 4,005,655 | 2/1977 | Kleinschmidt et al. | 244/138 R |

Primary Examiner—Galen Barefoot
Attorney, Agent, or Firm—Dorr, Carson, Sloan & Peterson

[57] ABSTRACT

A balloon parachute is described that inflates at a controllable rate to gradually slow the descent of an attached instrument package. This balloon parachute is in the form of a pyramid that is closed on all sides in all three dimensions. The balloon parachute is tethered to an instrument package by means of a fabric loop attached to the peak of the parachute pyramid. The inflation of the balloon parachute is effectuated by the use of a set of openings in the peak, just above the loop attachment. As the balloon parachute and instrument package descend, air enters the balloon parachute through the openings in the peak thereof and gradually inflates the balloon parachute to its full pyramidal shape. A burble fence is attached to the base of the pyramid on all sides in order to provide additional drag and rotational stability, and to avoid a penduluming motion of the parachute upon its descent.

6 Claims, 3 Drawing Sheets

BALLOON PARACHUTE

FIELD OF THE INVENTION

This invention relates generally to aerodynamic decelerators, and more specifically, to a self-inflating parachute having an inverted pyramidal shape, with all sides of the parachute being closed in all dimensions.

PROBLEM

A number of problems exist with prior art parachutes used to deploy instrument packages from airplanes. In many conventional parachute systems, a drogue chute and a delay timer were employed in order to avoid subjecting the instrument package to a high shock load after the instrument package is ejected from the aircraft. The drogue chute was used to pull a pin on the timer which releases a large main parachute after a delay of several seconds, when the instrument package is clear of the aircraft. Not only was the drogue chute/timer combination relatively expensive, but in addition, the instrument package was subject to a potentially destructive high-g deceleration shock when the large main parachute opened. Furthermore, the main parachute must be carefully packed to ensure that it will open reliably, and after opening, the parachute suspension lines are still prone to being tangled.

Another type of airborne decelerator, called a "ballute", is a torroid-shaped elastic bag inflated with internal gas pressure. The inflation pressure of the ballute is a critical factor in its performance. In addition, ballutes are prone to spin in flight, a characteristic which typically necessitates the use of swivel means for attaching the instrument package to the ballute. Finally, compared to the present invention, a ballute is relatively expensive to construct, pack, and deploy.

SOLUTION

The above problems are solved and a technical innovation achieved in the field by the balloon parachute of the present invention. The present invention consists of a balloon parachute that inflates at a controllable rate to gradually slow the descent of an attached instrument package. This balloon parachute is in the form of an inverted pyramid that is closed on all sides in all three dimensions. The balloon parachute is tethered to an instrument package by means of a fabric loop attached to the peak (vertex) of the parachute pyramid. The controllable inflation of this balloon parachute is effectuated by the use of a set of openings in the peak, just above the loop attachment. The initial shape of the balloon parachute when it is deployed is in the form of a streamer attached to the instrument package. As the balloon parachute and instrument package descend, air enters the balloon parachute through the openings in the peak thereof and gradually inflates the balloon parachute to its full pyramidal shape. By careful selection of the size of the openings in the peak of the balloon parachute, the rate of inflation can be very precisely regulated. The drogue chute/timer combination of the prior art is thus eliminated, and the potentially destructive high-g deceleration shock associated with prior art parachutes/ballutes is avoided. Furthermore, the balloon parachute quickly deflates after contacting the ground, and therefore does not cause the payload to be dragged along the ground in windy conditions.

A burble fence is attached to the base of the pyramid on all sides in order to provide additional drag, rotational stability, and, more importantly, to avoid a penduluming motion of the parachute upon its descent. The spinning problems typically associated with ballutes and conventional parachutes are thus avoided. Finally, the balloon parachute of the present invention is much easier to assemble and less costly than either a conventional parachute or a ballute.

DETAILED DESCRIPTION OF THE INVENTION

Figure 1:
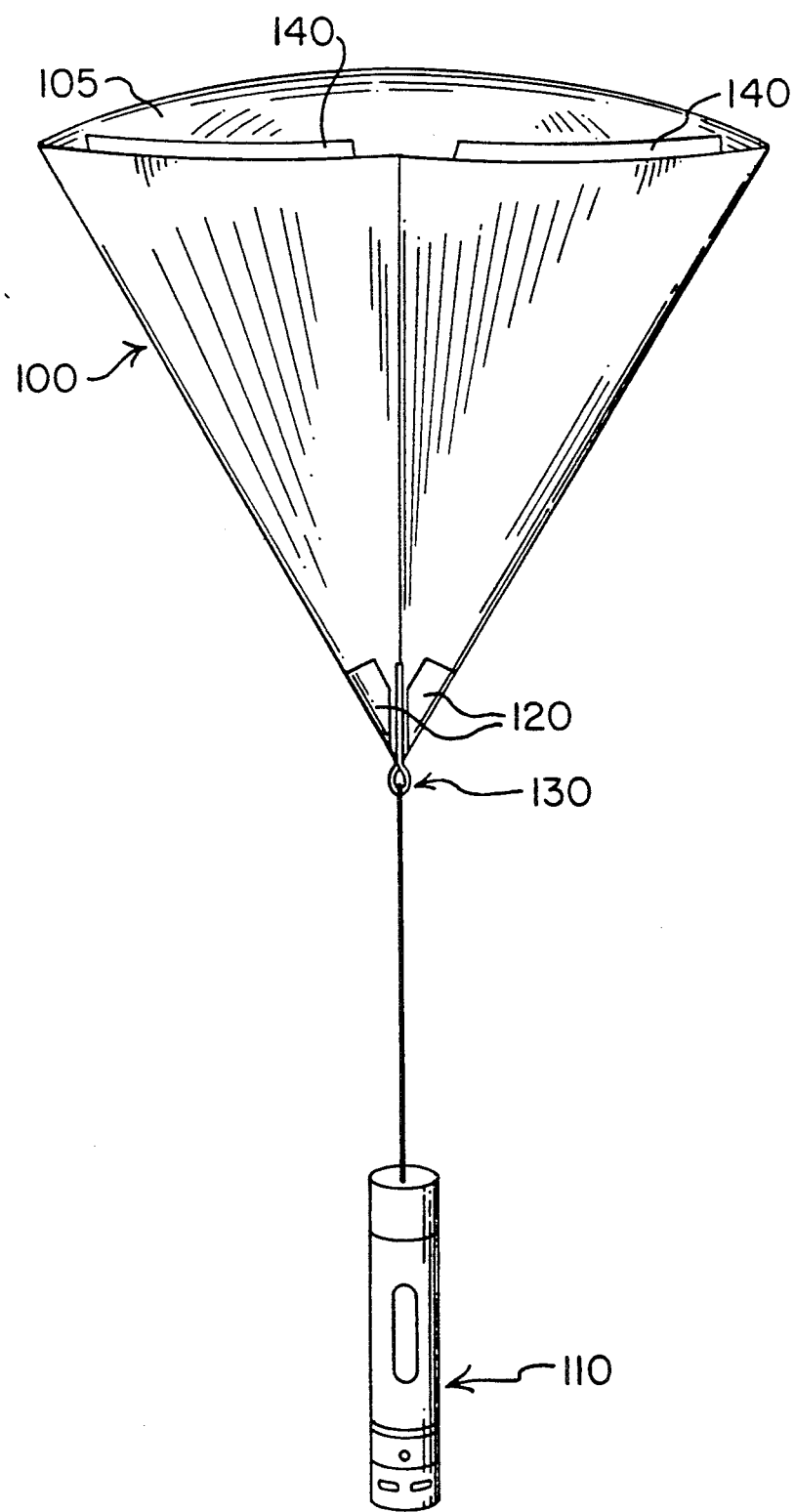
FIG. 1 is a perspective view of one embodiment of the present invention, showing a descending inflated balloon parachute to which an instrument package is attached.

FIG. 1 is a perspective view of one embodiment of the present invention, showing a descending inflated balloon parachute 100 to which an instrument package 110 is attached. The balloon parachute 100 is inflated gradually by air passing through a pair of air intake vents 120 as the balloon parachute 100 descends through the air. The gradual inflation of the balloon parachute 100 significantly reduces the high-g deceleration shock associated with prior art aerodynamic decelerators, such as ballutes and conventional parachutes. This high-g deceleration of prior art devices can be typically greater than 100 times the force of gravity (100 g's) and can be destructive to the instrument package 110. Four "burble fences" 140 are attached to the top panel 105 of the balloon parachute 100. The burble fences 140 create air turbulence above the balloon parachute 100 which tends to stabilize the parachute 100 during its descent. Note that the instrument package 110 is attached to the balloon parachute 100 by means of a single fabric loop 130, rather than by a plurality of lines used by a conventional parachute.

Balloon Parachute Construction

Figure 2:
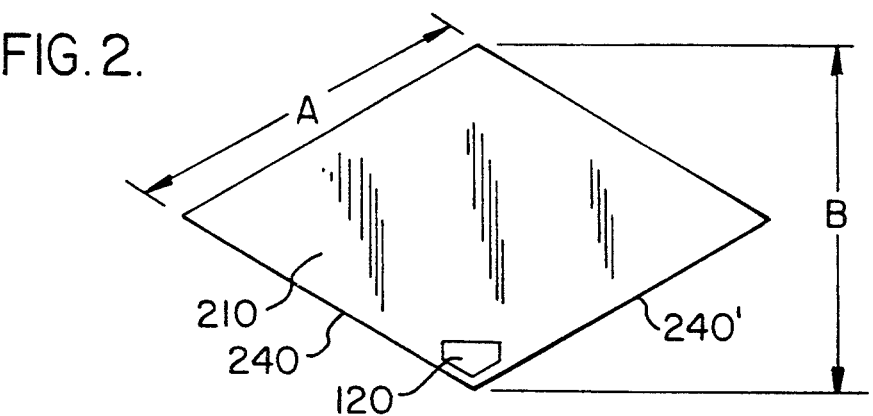
FIG. 2 is a plan view of one of two identical side panels which comprise the pyramidal body of the balloon parachute.
Figure 3:
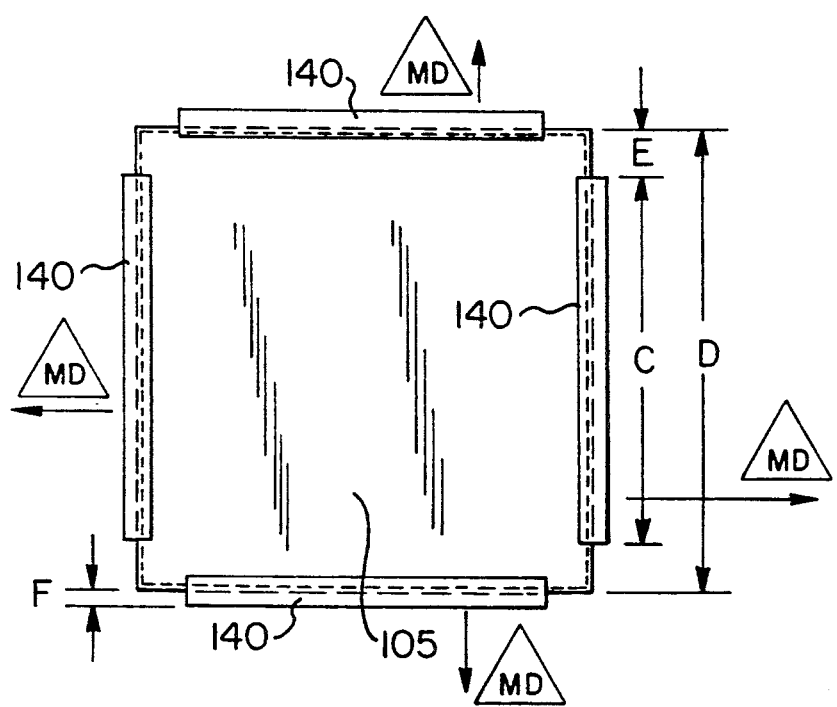
FIG. 3 is a top view of the balloon parachute, showing the burble fences attached to the top panel.

FIG. 2 is a plan View of one of two identical side panels 210 which comprise the pyramidal body of the balloon parachute 100, and FIG. 3 is a top view of the balloon parachute 100, showing the top panel 105. The dimensions of the top panel 105 and side panels 210 of one embodiment of the balloon parachute 100 are approximately as follows:

A=0.6 m
B=0.6 m
C=0.5 m
D=0.6 l m
E=5.0 cm
F=3.5 cm

The two side panels 210 and the top panel 105 are fabricated from standard ¾ 4 ounce per square yard ripstop nylon having a porosity of <40 cfm/sq. ft. @25 mb overpressure. This low porosity allows the parachute body to retain a sufficient amount of air to inflate like a balloon when, upon descent, air enters the parachute through the air intake vents 120. The bottom edge 240 of one of the side panels 210 is sewn to the bottom edge 240 of the other side panel 210, and the bottom edge 240' is sewn to the bottom edge 240' of the other side panel 210, thus forming the body of the balloon parachute 100. The top panel 105 is then sewn to the two sewn-together side panels 210.

The top panel 105, as well as the side panels 210, each have sections 120 and 140 of relatively porous mesh fabric. The top panel 105 has four mesh "burble fences" 140 sewn along each edge thereof, and each side panel 210 has a mesh air intake vent 120 sewn into the apex of the panel situated at the vertex of the balloon parachute pyramid. Note, on FIG. 3, that each of the triangles with the notation "MD" is situated next to an arrow indicating the "machine direction" of the mesh fabric used to make the burble fence. This orientation of the fabric machine direction is important, because a typical mesh fabric is significantly more rigid, or "stiffer" in the machine direction, than in the direction 90 degrees transverse thereto. In order that the burble fence fabric may provide optimum turbulence, it is thus required that the stiffer dimension of the fabric be oriented in the direction of the arrows (i.e., the fabric is most resistant to bending about an axis perpendicular to arrow "C", in the plane shown in FIG. 3). There is a ratio of approximately 19.4% of total burble fence 140 area to the area of the balloon parachute top. The ratio of the burble fence 140 width to the width (length) of a side of the top of the balloon parachute 100 is 0.07 meters/0.6 meters, which is a ratio of approximately 6%.

Figure 4:
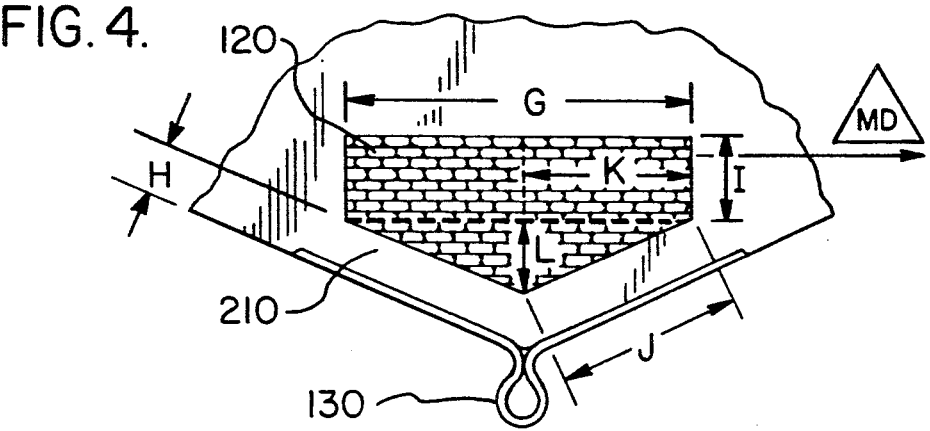
FIG. 4 is a detail view of an air intake vent located on one side panel of the balloon parachute.

FIG. 4 is a detail view of an air intake vent 120 located on one side panel 210 of the balloon parachute 100. The dimensions of the air intake vent 120 for the described embodiment are:
G=13.1 cm
H=2.5 cm
I=4.2 cm
J=7.6 cm
K=6.55 cm
L=3.9 cm The size and mesh characteristics of the air intake vents 120 are designed to provide for a controlled, slow inflation of the balloon parachute 100 so as to preclude the high-g deceleration shock associated with prior art aerodynamic decelerators such as ballutes and conventional parachutes. Note the machine direction of the intake vent fabric (as identified by the arrow next to the triangle containing the notation "MD"). The intake vent fabric is oriented so that the stiffer direction of the fabric is parallel to the arrows corresponding to "G" in FIG. 4; that is, the fabric is most resistant to bending about axes parallel to "I". Thus oriented, the fabric is more easily stretched in the "I" direction than in the "G" direction. The total air intake vent 120 area for a balloon parachute 100 having a total side panel 210 surface area of 0.6 square meters is approximately 0.16 square meters, or 2.7% of the total side panel 210 surface area, assuming that the air intake vents 120 are made from fabric having a 54% open area.

In one embodiment of the present invention, the mesh fabric from which the burble fences 140 and the air intake vents 120 is constructed is, for example, a polyester lacetta canvas having 54% open area. It is to be understood, however, that mesh fabric having an open area other than 54% could be used, and the resulting balloon parachute 100 would still fall within the scope of the present invention. For example, if a mesh fabric having an open area of 50% were to be used for the air intakes, the relative surface area of the air intake vents 120 would have to be increased from 2.7% of the total side panel 210 surface area to 2.9% of the total side panel 210 surface area.

The balloon parachute 100 is tethered directly to the instrument package 110 by means of a fabric loop 130 attached to the peak (vertex) of the parachute pyramid. The balloon parachute 100 does not exhibit a "propeller" (rotational) effect, such as occurs when lines are used on a parachute, and all of the lines are not of equal length.

Deployment Performance

Figure 5:
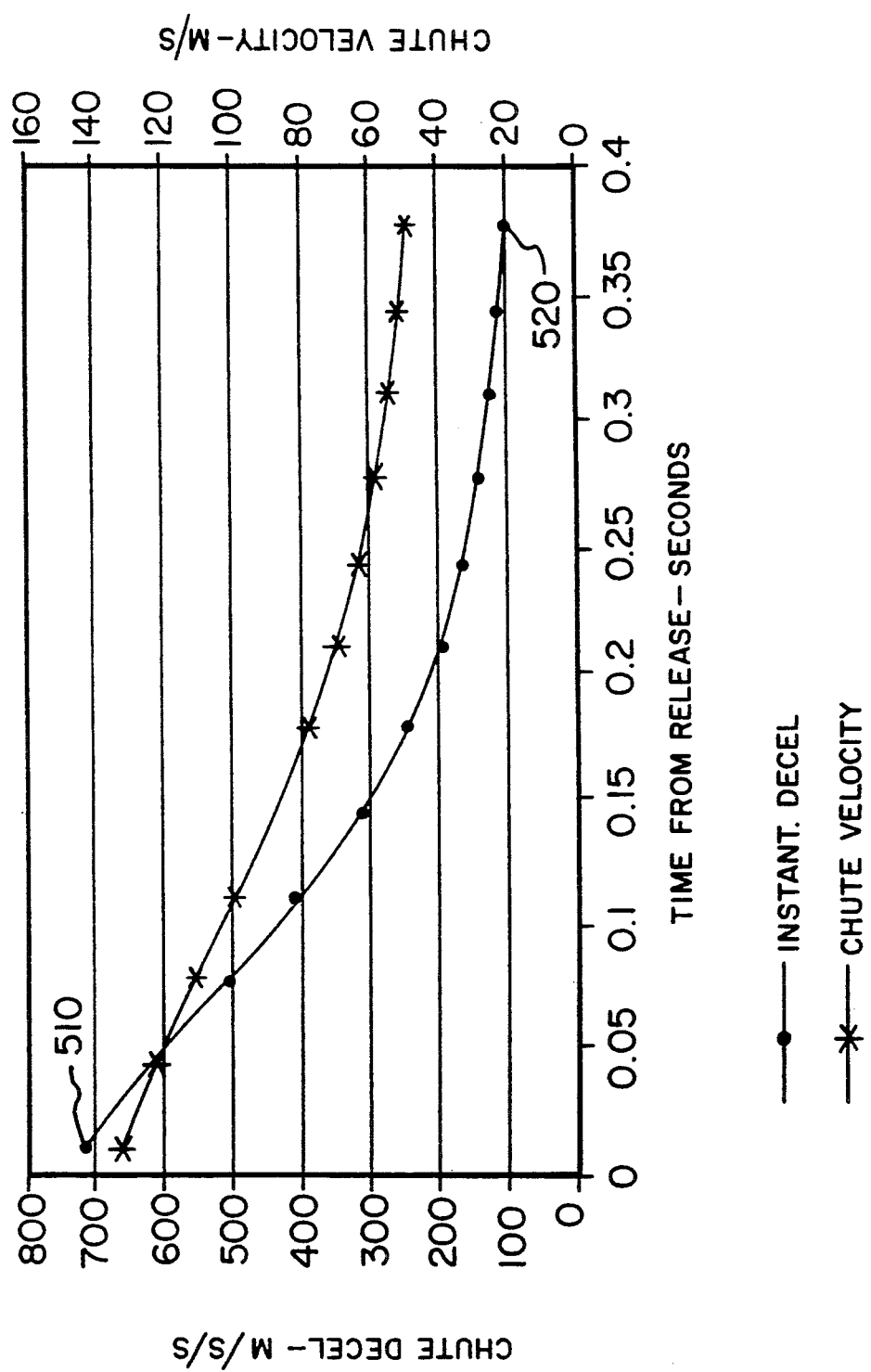
FIG. 5 is a graph showing typical deceleration of the balloon parachute of the present invention when used to deploy an instrument package.

The initial shape of the balloon parachute 100 when it is deployed is in the form of a streamer attached to the instrument package 110. The balloon parachute 100 does not require a ripcord in order to open, unlike a conventional parachute. Rather, the parachute 100 is free to fall and self-deploy after being ejected from the aircraft. As the instrument package 110 descends, air enters the balloon parachute 100 through the air intake vents 120 located near the vertex thereof and gradually inflates the balloon parachute 100 to its full pyramidal shape. The rate of inflation can be very precisely regulated by selection of the size of the air intake vents 120 and by selection of the porosity of the fabric from which the vents 120 are made. Since there are no lines connecting the balloon parachute 100 to the instrument package 110, there is no potential for entangling of the balloon parachute 100 and the instrument package 110 upon deployment. Typical deceleration of the balloon parachute 100 of the present invention when deploying an instrument package 110 is shown graphically in FIG. 5. The left vertical axis represents the balloon parachute instantaneous deceleration in M/S/S, and corresponds to the curve connecting the points labeled 510 and 520. The right vertical axis shows the velocity of the balloon parachute in M/S, and corresponds to the second curve shown on the graph. The FIG. 5 graph shows data for a balloon parachute 100 having an effective area of 0.36 square meters, with a weight of 50 grams, deploying an instrument package 110 weighing approximately 280 grams. In FIG. 5, the data was gathered in the situation wherein the balloon parachute 100 was deployed from an aircraft travelling at a speed of 137 meters per second at an altitude approximately 1.5 kilometers (above sea level). The time required to completely fill the balloon parachute 100 was 13.5 seconds (with a standard deviation of 2.9 seconds for a total of 9 drops). It can be seen, at 520, that the instantaneous deceleration of the balloon parachute 100 is reduced to approximately 100 m/s/s (meters per second per second) in less than 0.4 seconds, with a brief peak deceleration, at 510, of slightly greater than 700 m/s/s. This peak deceleration is significantly less than a typical peak deceleration of more than 1000 m/s/s which occurs when a conventional parachute is used to deploy an instrument package 110 of equivalent mass. Although not shown on the graph, at approximately 2 seconds after deployment from the aircraft (at which time an antenna is typically released from the instrument package 110), the balloon parachute/instrument package velocity is less than 10 m/s. The balloon parachute 100 becomes fully inflated in less than 10 seconds after being dropped, and reaches a final velocity of approximately 5 m/s at sea level.

Although an embodiment of the balloon parachute 100 has been described which is relatively small in size, the scale of the balloon parachute 100 may be increased so that larger payloads, such as a person or a missile, may be deployed. It is to be expressly understood that the claimed invention is not to be limited to the description of the preferred embodiment but encompasses other modifications and alterations within the scope and spirit of the inventive concept.

I claim:

1. A balloon parachute comprising:

an enclosure fabricated from a relatively non-air porous fabric, said enclosure having a vertex, a rectangular top, and an upper surface disposed therebetween, said top having four edges, with a strip of air-porous fabric attached lengthwise in parallel disposition to each of said edges, said strip of said air-porous fabric having a length substantially the same as a length of said edge, said upper surface having at least one relatively air-porous porous intake vent located near vertex, said intake vent allowing air to pass therethrough into an interior of said enclosure, thereby inflating said enclosure when said balloon parachute descends through the air.

2. The balloon parachute of claim 1, wherein each of said strips of air-porous fabric is approximately 50% open and extends between approximately 5% and 15% of the width of said top beyond said edge to which it is attached.

3. The balloon parachute of claim 1, wherein each of said strips of air-porous fabric has a surface area equal to a between approximately 5% and 15% of the surface area of said top. approximately 5% of the width of said bottom beyond.

4. A balloon parachute comprising:

a pyramidal-shaped enclosure constructed from a relatively non-air-porous fabric, said enclosure including a first side, a second side, and a rectangular top having 4 edges, each of said first and said second sides being rhombus-shaped, said top having a first edge and a second edge attached to a first top edge and a second top edge of said first side, respectively, a third edge and a fourth edge of said top being attached to a first top edge and a second top edge of said second side, respectively, a first bottom edge of said first side being attached to a first bottom edge of said second side, and a second bottom edge of said first side being attached to a second bottom edge of said second side, said first and second bottom edges of each of said first and second sides forming a vertex of a pyramid, each of said first and second sides having at least one relatively air-porous opening near said vertex through which air may pass, thereby inflating said balloon parachute upon descent thereof.

5. The balloon parachute of claim 4, wherein a strip of porous fabric is attached lengthwise in parallel disposition to each of said edges of said top.

6. The balloon parachute of claim 4, wherein said vertex of said pyramidal-shaped enclosure is connected to an object to be dropped through the air.

* * * * *

UNITED STATES PATENT AND TRADEMARK OFFICE
CERTIFICATE OF CORRECTION

PATENT NO. : 5,149,019
DATED : September 22, 1992
INVENTOR(S) : Sigvard J. Stenlund It is certified that error appears in the above-identified patent and that said Letters Patent is hereby corrected as shown below:

Column 5, line 20, delete the word "porous" after "air--porous";
Column 5, line 21, after "near", insert —said—.

Column 6, line 2, after "area of said top", insert a period;
Column 6, lines 2 and 3, delete "approximately 5% of the width of said bottom beyond."

Signed and Sealed this

Twenty-sixth Day of April, 1994

Attest:

BRUCE LEHMAN

Attesting Officer   Commissioner of Patents and Trademarks